UNITED STATES PATENT OFFICE.

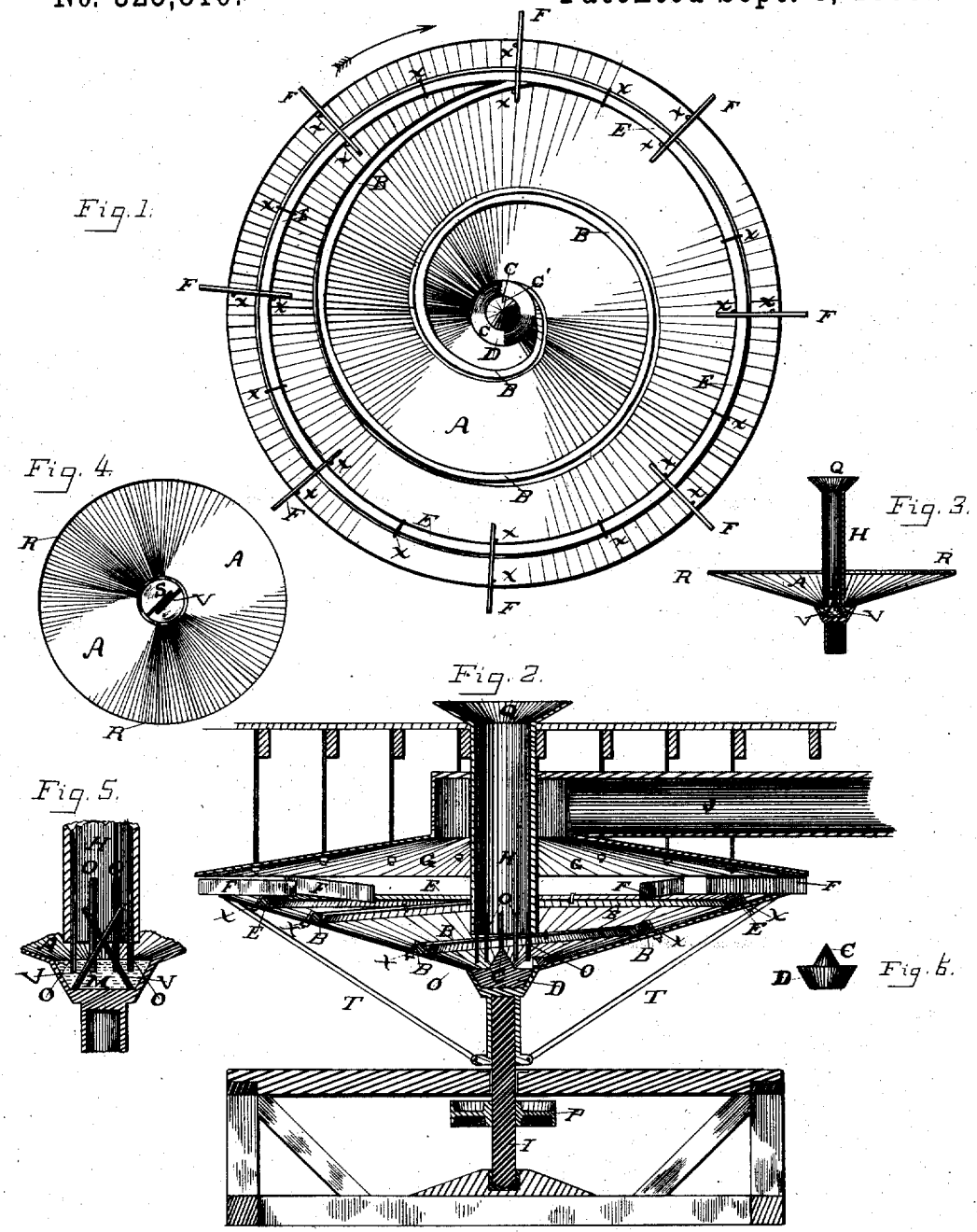

ALLEN GILBERTS BEEBE, OF LOS ANGELES, CALIFORNIA.

MINERAL SEPARATOR AND AMALGAMATOR.

SPECIFICATION forming part of Letters Patent No. 325,810, dated September 8, 1885.

Application filed July 16, 1885. (No model.)

*To all whom it may concern:*

Be it known that I, ALLEN GILBERTS BEEBE, a citizen of the United States, residing at Los Angeles, in the county of Los Angeles and State of California, have invented a new and useful Improvement in Mineral Separators and Amalgamators, of which the following is a specification.

My invention relates to devices adapted to separate free metals of great specific gravity from the earth and débris without the use of water. This I accomplish by means of the device described herein and illustrated in the accompanying drawings, in which—

Figure 1 is a plan view of the separating-pan provided with riffles and fans for working light dry débris. Fig. 2 is a mid-section of a form of my machine specially adapted for light and dry débris. Fig. 3 is a mid-section of a form of my machine adapted for working wet or damp matter. Fig. 4 is a plan of the pan of the same. Fig. 5 is a mid-section of the center of the same on an enlarged scale. Fig. 6 shows the cone which fits into the mercury-reservoir in the center of the pan when the mercury is not used.

A is the pan, which is funnel-shaped, having an angle of fifteen degrees, more or less. S is a basin in the center of the pan. C D is a cone which fits therein, and is employed when mercury is not used. B is a spiral riffle extending from near the center to near the rim of the pan. E is an annular riffle near the rim of the pan. F F are fans placed upon the upper side of the pan at its outer edge. G is a cover to control the draft, and prevent the dust from rising. H is the penstock through which the material is supplied to the machine. Q is the hopper at the upper end thereof. J is an air-conduit opening through the top of the cover around the penstock. O O are rods or fingers attached to the lower end of the penstock for the purpose of stirring and separating the débris from the metal. V V are rods attached to the bottom of the pan for the purpose of mixing the mercury and mineral-bearing earths or ores together when mercury is used. M is the mercury. S is the reservoir in the center of the pan in which the mercury is contained. R is a slight barrier around the rim of the pan in one form of my machine. I is the shaft upon which the pan is mounted. P is the pulley which drives the same.

The principle upon which my machine operates is as follows: When any loose material is placed upon the center of a rapidly-revolving disk, it acquires the motion of the disk, and the centrifugal force causes it to move toward the circumference of the disk slowly at first, and then more rapidly until it is thrown off at the outer edge. In operating my machine the shaft I is connected with the driving power by means of a belt passing around the pulley P and is rotated, thus turning the pan A.

I have shown two forms of my machine, one being better adapted for working dry mineral-bearing earths or ores, and the other for working wet earths and ores. The form shown in Figs. 1 and 2 is best adapted for working dry material, and its operation is as follows: The pan is caused to rotate and the material, which must be finely pulverized, or, in case of placer-mines, properly screened, is thrown into the pan through the penstock H. It falls upon the cone C at the center, and is thrown outward toward the circumference thereby. The friction upon the bottom of the pan causes the material to acquire the rotary motion of the pan, and it is caused by the centrifugal force to move toward the outer edge thereof, accelerating its speed as it advances. The spiral riffle B intercepts it, and the heavier particles, which lie close to the bottom, are retained, while the lighter particles and coarser débris are forced over the same and pass on. The annular riffle E, near the circumference, prevents the escape of such heavier material as may pass the spiral riffle. The pan is rotated in the direction shown by the arrow in Fig. 1, so that the action of the spiral riffle tends to work the heavier material caught thereby back into the center of the pan.

The riffle may be inclined toward the center of the pan on its inner face, as shown in the drawings, or it may be perpendicular. I do not wish to limit myself to the diamond riffle shown, as other angles for the inner face of the riffle may be used advantageously.

As the pan rotates the fans upon the periphery cause a blast of air to pass through the inlet J downward around the penstock and outward from thence, carrying out the finer particles of dust which may arise.

The conduit J may be dispensed with, and the air be drawn downward through the penstock instead.

The angle at the bottom of the pan may be greater or less, as may be considered most advantageous. The lower the angle the more rapidly the débris will pass off; but there is greater liability of losing particles of the mineral.

The riffles and fans are secured to the pan by bolts X X, and may be removed when it is desired to operate upon wet earth or ore which would be apt to clog the riffles. Figs. 3, 4, and 5 show the riffles removed, leaving the bottom of the pan smooth. When the riffles are dispensed with, the cone C D is removed and the reservoir in the center of the pan is filled with mercury.

Agitators V V are secured to the bottom of the reservoir, and, in conjunction with the fingers O O, which extend down into the mercury, the earth or ore is mixed with the mercury before it is allowed to pass off, thus causing the gold and silver to unite with the mercury, which retains it while the débris passes off. This form of my machine may be used for amalgamating dry earths and ores, in which case the riffles may be retained.

The rapidity with which the pan is rotated may be varied to produce the best results with different ores; and it will also be found advantageous to line the bottom of the pan with a blanket or other coarse material, as is customary with separators of other descriptions now in use. The fans can be placed at any angle desired.

The size of the pan and the various parts may be varied, as desired.

Now having described my invention, what I claim as new, and desire to secure by Letters Patent, is—

1. The combination, in a mineral-separator, of the rotating funnel-shaped pan A, spiral riffle B, annular riffle E, central cone, C, penstock H, and fingers O.

2. The combination, in a mineral-separator, of a rotating separating-pan having blast-fans mounted thereon near the periphery thereof, a cover extending over such pan, and a conduit for the admission of air near the center of the pan, substantially as set forth.

ALLEN GILBERTS BEEBE.

Witnesses:
 JAS. R. TOWNSEND,
 A. L. HAMILTON.